United States Patent [19]

Becker et al.

[11] 4,208,459

[45] Jun. 17, 1980

[54] BONDED, DIFFERENTIALLY CREPED, FIBROUS WEBS AND METHOD AND APPARATUS FOR MAKING SAME

[76] Inventors: Henry E. Becker, 475 Bobbin Mill Rd., Media, Pa. 19063; Albert L. McConnell, 210 Governors Dr., Wallingford, Pa. 19086; Richard W. Schutte, Sugarfoot Farm, 3519 E. Goshen Rd., Newtown Square, Pa. 19073

[21] Appl. No.: 741,308

[22] Filed: Nov. 12, 1976

Related U.S. Application Data

[60] Division of Ser. No. 156,327, Jun. 24, 1971, Pat. No. 4,158,594, which is a continuation-in-part of Ser. No. 27,743, Apr. 13, 1970, abandoned.

[51] Int. Cl.$^2$ .......................... B32B 29/06; B32B 3/00

[52] U.S. Cl. .................................. 428/154; 128/290 R; 162/111; 162/112; 428/195; 428/211; 428/219; 428/220

[58] Field of Search ............... 428/152, 153, 195, 211, 428/274, 288, 289, 154; 162/111, 169, 179, 136, 112; 156/280, 291; 264/283; 128/290 R

[56] References Cited

U.S. PATENT DOCUMENTS

| | | | |
|---|---|---|---|
| 2,610,935 | 9/1952 | Rowe | 264/283 |
| 2,960,089 | 11/1960 | Harwood et al. | 128/290 R |
| 3,009,822 | 11/1961 | Drelich et al. | 428/195 |
| 3,017,317 | 1/1962 | Voightman et al. | 162/111 |
| 3,047,444 | 7/1962 | Harwood | 428/153 |
| 3,059,313 | 10/1962 | Harmon | 428/198 |
| 3,214,323 | 10/1965 | Russell et al. | 428/288 |
| 3,395,708 | 8/1968 | Hervey et al. | 162/179 |

*Primary Examiner*—P. J. Thibodeau

[57] ABSTRACT

A method is disclosed for forming a strong, soft, fibrous sheet material having substantial stretch in all directions in its own plane, by applying a pattern of bonding material to a fibrous web, adhering only portions of the web containing bonding material to a creping surface, removing the web from the creping surface by a creping blade to differentially crepe it, whereby a combination of high strength, softness, and bulk are imparted to the web. Sheet materials formed by the above method are also disclosed.

41 Claims, 9 Drawing Figures

BONDED, DIFFERENTIALLY CREPED, FIBROUS WEBS AND METHOD AND APPARATUS FOR MAKING SAME

RELATED APPLICATIONS

This is a division of U.S. Patent Application Ser. No. 156,327, filed June 24, 1971, now U.S. Pat. No. 4,158,594, issued June 19, 1979, which is a continuation-in-part of Ser. No. 27,743, filed Apr. 13, 1970, now abandoned.

BACKGROUND OF THE INVENTION

1. Field of the Invention

This invention relates to improved fibrous sheet material, and methods and apparatus for forming it, and more particularly, to fibrous sheet material which is patterned bonded and differentially creped to impart thereto a combination of improved tensile strength, softness, bulk and substantial stretch in all directions in its own plane.

2. Description of the Prior Art

In the past, there has been extensive activity in the field of papermaking to discover ways of imparting softness to paper webs without degrading their strength. Paper webs are conventionally softened by working them in different ways, such as by creping them from a drying surface with a creping blade. Such a process disrupts and breaks many of the interfiber bonds in the paper web which are formed during the drying thereof by the hydrate bonding process associated with papermaking. However, these interfiber bonds are the principal source of strength in an ordinary paper web. Very little strength results from the physical entanglement of the fibers since papermaking fibers have such an extremely short length, generally on the order of 1/16 inch or less.

Attempts to improve this situation have involved the creping of webs in only a selected spaced-apart areas over its surface, such as by creping with a notched or serrated creping blade, or creping from a discontinuous surface such as a circumferentially grooved roll, leaving the portions therebetween with substantially all of their strength. However, such creping patterns necessarily created lines of weakness through the sheet so that the ultimate sheet was not very strong at least in certain directions.

One of the characteristics of a sheet product which gives the semblance of strength is the toughness of the sheet. In essence, this is representative of a combination of the tensile strength of the sheet and the ability of the sheet to stretch. Obviously, if the sheet can absorb some work imposed upon it by stretching so as to avoid firmly resisting the full force applied, the resulting web appears subjectively to be stronger. It has long been known to crepe webs in various ways to create stretch and, accordingly, to impart toughness. However, even webs which have been creped in one direction, or in several different directions so as to impart universal or isotropic stretch, are weakened by the creping, and accordingly, do not have as much strength as desirable.

In the field of nonwoven webs, which generally include substantial amounts of fibers having a length greater than ¼ inch, it has been common practice to apply bonding material to spaced portions of the web so that fibers in at least portions and perhaps in a network across the web become bonded together to impart strength to the web. However, the fibers in such nonwoven webs are sufficiently long to enable small amounts of adhesive to impart substantial strength to the web since any two adjacent areas of adhesive application can be quite far apart and yet be able to bond one fiber into a network.

It has often been thought that to apply bonding material to a paper web to impart strength thereto would result in harsh areas in the sheet which would destroy any feeling of softness which is desirable. In addition, in view of the extremely short length of papermaking fibers, it has been felt that the amount of bonding material and the large percentage of the overall area of the sheet which would have to be impregnated to impart any strength to the sheet would result in a very hard sheet, having little or no stretch and poor softness characteristics.

It was therefore quite unexpected and surprising to discover a method of applying a bonding material to a paper web to impart strength thereto without impairing the softness thereof and, furthermore, to increase the bulk of such a web and to impart substantial stretch in all directions in the plane of the web. This method enables even softer and bulkier webs to be formed and utilized than was heretofore possible in view of the addition of substantial strength to the web by the bonding material. Thus, webs could be formed in a conventional manner on a papermaking machine from fibers which were treated with a chemical debonder to reduce the interfiber bonding capacity thereof, or under conditions of reduced pressing during web formation to reduce the amount of interfiber bonding in the web, or by treating a web which had been previously creped and thereby weakened, all of such webs being characterized by very little interfiber bonding strength. However, by the method of this invention, this deficiency is overcome by the application of a bonding material thereto in a fine pattern. In addition, the method of this invention involves the creping of the bonded areas of the web which results in the softening of the surface thereof to remove the harshness previously experienced due to bonded web portions. Unexpectedly it was discovered that such creping not only softened the surface of the bonded areas, but also generally substantially increased the bulk of the web. In addition, such creping shortened only such bonded portions of the web in a manner causing buckling or puffing of unbonded areas of the web so that substantial stretch in all directions in the plane of the web was achieved.

SUMMARY OF THE INVENTION

The present invention is a strong, soft, fibrous sheet material having substantial stretch in all directions in its own plane. The sheet material comprises a fibrous web having a basis weight of from about 6 to about 60 pounds per ream of 2880 square feet. The web is characterized by a fine pattern of raised areas and depressions distributed over each of its surfaces, the raised areas on one side of the web forming the depressions on the other side of the web and the depressions on one side of the web forming the raised areas on the other side of the web. A bonding material is disposed in the raised areas on one side of the web so as to bond at least some of the fibers together therein to form bonded web portions of greater strength than adjacent unbonded web portions which do not contain the bonding material. The raised surface of each of the bonded web portions is finely creped on the side of the web to which bonding material is applied so as to impart softness and stretch thereto.

In a preferred embodiment, the web is characterized by very low overall interfiber bonding strength except that created by the bonding material in the bonded areas. This low interfiber bonding stretch may be achieved by treating the fibers with a chemical debonding agent prior to or during web formation, or by forming the web under conditions of reduced pressure until it is initially substantially dried, either of which avoids the formation of many interfiber bonds, or by creping the web after its formation to disrupt and break many of the interfiber bonds and to provide stretch. In certain embodiments of the sheet materials of the present invention, portions of the web adjoining the bonded web portions are split internally in the general plane of the web so that the web has increased bulk, softness and flexibility.

A preferred form of the sheet material of the present invention comprises a soft, absorbent, creped fibrous web formed by deposition from an aqueous slurry, which web comprises a random matrix of lignocellulosic fibers and an elastomeric bonding material at some of the contact points between the fibers. The elastomeric bonding material imparts structural integrity to the web but does not form the hard or brittle interfiber bonds which result from natural interfiber bonding experienced in papermaking. This web has a basis weight of from about 10 to about 30 lbs./2880 $ft^2$, a TEA-to-stiffness ratio greater than $1.50\times10^{-4}$, and an average calculated density throughout its thickness under no load of less than 0.300 grams per cubic centimeter. These latter two properties have been found to be excellent indicators of the softness and wiping ability of such a sheet material which are important characteristics for determining the suitability of use of the sheet material in a number of different sanitary paper products.

The method of the present invention results in the formation of a strong, soft, fibrous sheet material having the abovementioned properties, and includes the steps of forming a web of cellulosic fibers having a basis weight of from about 5 to about 55 pounds per ream of 2880 square feet, and applying a bonding material to one surface of the web in a fine pattern to form bonded web portions in which fibers are bonded together by the bonding material. One surface of the web is brought into engagement with a creping surface so as to adhere the bonded web portions to the creping surface, and the web is then creped from the creping surface to form the sheet material of the present invention. In certain embodiments, the method of the present invention includes forming the web initially under conditions which result in low interfiber bonding strength. The bonding material may be applied to the web by printing directly thereon prior to engagement of the web with the creping surface, or, alternatively, by first applying the bonding material to a creping surface and then bringing the web into engagement with the creping surface so as to substantially simultaneously apply the bonding material to the web and adhere the web to the creping surface. The web is then creped from the creping surface to form the sheet material of the present invention.

DETAILED DESCRIPTION OF THE PREFERRED EMBODIMENTS

At the outset, it should be clearly understood that the method of the present invention may be applied to a wide variety of webs in order to form the sheet material of the invention therefrom. This means that a wide variety of processes may be utilized to initially form such webs. For example, the webs may be formed by depositing fibers on a condensing means such as a foraminous surface from suspension in a fluid medium, which may be either gaseous or liquid. Thus, the initial sheet may be either air-layed or wet-layed, that is, formed from fibers deposited from either a gaseous suspension or a liquid suspension onto a condenser such as a Fourdrinier wire as is commonly done in papermaking.

Figure 1:
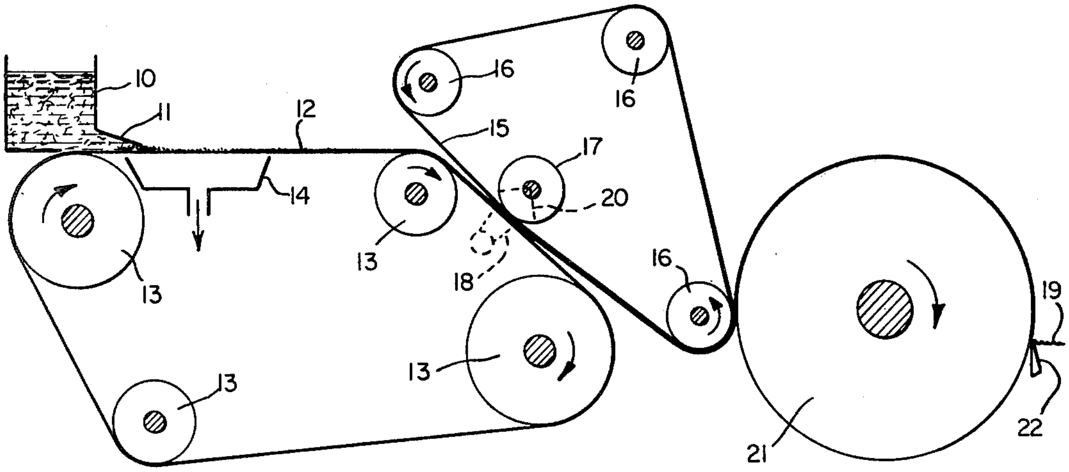
FIG. 1 is a schematic side elevation view of one form of apparatus for forming a fibrous web suitable for treatment by the method of the present invention to form the sheet material of the present invention.

FIG. 1 schematically illustrates a papermaking machine which is capable of forming a web to which the method of the present invention is applied. A headbox 10 is provided to hold a supply of fiber furnish, which generally comprises a dilute slurry of fibers and water. The headbox 10 has a slice 11 disposed over the moving surface of a condenser 12, which in this embodiment comprises a foraminous woven wire such as a Fourdrinier wire. The fiber furnish in headbox 10 issues from the slice 11 onto the surface of the wire 12. The wire 12 is carried through a continuous path by a plurality of guide rolls 13, at least one of which is driven by a drive means (not shown). A vacuum box 14 is disposed beneath the wire 12 and is adapted to assist in removing water from the fiber furnish in order to form a web from the fibers. In addition, other water removal means, such as hydrofoils, table rolls, and the like (not shown), may be employed beneath the upper flight of the wire 12 to assist in draining water from the fiber furnish. Upon nearing the end of the upper flight of the Fourdrinier wire 12, the web is transferred to a second carrying member 15, which may be either a wire or a felt. This second carrying member 15 is similarly supported for movement through a continuous path by a plurality of guide rolls 16.

The transfer of the web from wire 12 to member 15 is accomplished by lightly pressing the carrying member 15 into engagement with the web on the wire 12 by a pickup roll 17. Actual web transfer from wire 12 to member 15 may be accomplished or assisted by other means such as an air knife 18 directed against the surface of wire 12 opposite the web, or a vacuum box 20 within the pickup roll 17, or both, such means being well-known to those skilled in papermaking techniques. At least one of the rolls 16 or 17 supporting the second carrying member 15 is driven by means (not shown) so that member 15 has a speed preferably equal to the speed of the wire 12 so as to continue the movement of the web. The web is transferred from member 15 to the surface of a rotatable heated dryer drum 21 such as a Yankee dryer. The web on the carrying member 15 is lightly pressed into engagement with the surface of the drying drum 21 to which it adheres, due to its moisture content and its preference for the smoother of two surfaces. As the web is carried through a portion of the rotational path of the dryer surface, heat is imparted to it, and generally most of the moisture therein is removed by evaporation. The web 19 is removed from the dryer surface in FIG. 1 by a creping blade 22, although it could be removed therefrom by peeling it off without creping if this were desired.

Drying may be accomplished by drying means other than the drying drum 21. Thus the dryer 21 may take a substantially different form, such as that shown in U.S. Pat. No. 3,432,936 issued on Mar. 18, 1969, to R. I. Cole, et al. This type of dryer accomplishes the removal of moisture from the web by passing air through the web to evaporate the moisture without applying any mechanical pressure to the web. This latter feature is advantageous in connection with the present invention for a number of reasons set forth below. In addition, a web which is dried in this manner is not usually creped, and this may be a desirable feature in certain instances.

At this point, regardless of the particular apparatus or process utilized, a web is formed which can be treated in accordance with the method of the present invention to form the sheet material of the present invention. Preferably, the web is comprised entirely of relatively short fibers, i.e. those having a length of less than ¼" and predominantly shorter, such as cellulosic fibers like wood pulp or cotton linters used in papermaking. However, relatively high percentages of longer fibers may be utilized without losing the advantages of the present invention, i.e. up to about 50% by weight of the fibers may have a length of up to about 2½" and may comprise any of the natural or synthetic textile length fibers, such as cotton, wool, rayon, regenerated cellulose, cellulosic ester fibers such as cellulose acetate fibers, polyamide fibers, acrylic fibers, polyester fibers, vinyl fibers, protein fibers, fluorocarbon fibers, dinitrile fibers, nitrile fibers, and others.

The web 19 preferably has a basis weight of between about 5 and about 55 pounds per 2880 square feet. It is sheet products in this general range which benefit most from the method of the invention since they are largely used where softness and bulk are important, and for fluid absorbency where the product is a wiper, but also where strength is important. It is in this range of basis weight where it is most difficult to impart to a product the combination of properties imparted by the present invention.

However, in preferred embodiments of the method of the present invention, the web at this point preferably possesses certain physical characteristics so that when it is treated by subsequent steps of the method of the present invention, it is transformed into sheet material of the present invention which has superior properties. Broadly described, these characteristics possessed by the web to be treated are all evidenced by a reduced amount of interfiber bonding strength in the web. The effect of such reduced interfiber bonding strength is to alter a number of characteristics of the web, for example, the bulk and softness of the web as well as the overall strength of the web. Although the softness is generally determined by the subjective feel of the material, it is believed to be physically more equivalent to the compressibility of the material.

Thus, although any fibrous web may be advantageously treated by the method of the present invention to create a softer, stronger, and generally bulkier web, the best form of sheet material of the present invention is made by treating webs which initially are relatively soft, bulky and quite weak. All of these properties are generally possessed by a web which has a low interfiber bonding strength. The method of the present invention then imparts an improved combination of softness, bulk, and strength to such webs.

This reduced interfiber bonding strength can be achieved in several ways. Thus, in some instances the web is creped, perhaps during its removal from the Yankee dryer 21 as shown in FIG. 1. Such a web is characterized by good softness and bulk characteristics due to the large number of interfiber bonds which are disrupted or broken during the creping operation. Such a web is also relatively weak and has good stretch characteristics, at least in the machine direction if conventionally creped and perhaps in the cross direction as well if creped successively in different directions as is well-known in the art.

In other instances, the fibers utilized to form the web 19 may be treated with a chemical debonder either in the fiber furnish, or prior to their addition to the fiber furnish, or even after formation of the web but prior to drying thereof, such as when the web is carried on the wire 12. Such chemical debonders are commonly used to reduce the number of sites along the individual fibers which are susceptible to interfiber bonding of the type utilized in papermaking. Debonding agents which may be used for this purpose include the cationic debonding agents disclosed in U.S. Pat. No. 3,395,708, issued Aug. 6, 1968, to Hervey et al., that is, substances within the class of long chain cationic surfactants, preferably with at least twelve carbon atoms in at least one alkyl chain, such as fatty dialkyl quaternary amine salts, mono fatty alkyl tertiary amine salts, primary amine salts, and unsaturated fatty alkyl amine salts; the cation-active tertiary amine oxides disclosed in U.S. Pat. No. 2,432,126, issued Dec. 9, 1947, to Schlosser et al.; and the cation-active amino compounds disclosed in U.S. Pat. No. 2,432,127, issued Dec. 9, 1947, to Schlosser et al.

In either of the instances described above, interfiber bonding strength is further reduced if the web is formed under conditions of reduced pressing while it is wet. Preferably, no mechanical pressing of the web is carried out, that is, the web is not subjected to compression between two elements or surfaces until it is substantially dried. Thus, contrary to typical papermaking techniques, wherein a pickup roll is used to press a felt into engagement with the web on a wire to transfer the web from the wire to the felt, this transfer may be accomplished by the use of air or vacuum or both. The alternative arrangements shown in phantom lines in FIG. 1 illustrates the manner in which this is accomplished. The use of any of these systems accomplishes web transfer without the application of pressure in any substantial amount to the web. Similarly, the web should not be pressed into engagement with the surface of a Yankee dryer by means as a pressure roll, such as is commonly done on a papermaking machine, but rather drying should be accomplished through the use of air flowing over or through the web as by the transpiration drying process disclosed in U.S. Pat. No. 3,432,936. The fibers forming the web are therefore not pressed into intimate engagement with one another so that the number of contact points between fibers and the interfiber bonding strength of the web are reduced. Such conditions of reduced pressing are preferably maintained until the web is substantially dried so that few interfiber bonds are formed. Of course, the foregoing clearly indicates that a press section, such as is conventionally used to extract moisture from a freshly-formed web prior to thermal drying, should not be employed when performing the preferred embodiment of the method of the invention. Such a press section results in substantial compaction of the web, thereby increasing the number of interfiber bonds and the resulting interfiber bonding strength of the web when it is dried.

The best results are obtained when the fibers in the web are treated with a chemical debonder, or when the web is formed under conditions of little or no pressing while it is wet, or when a combination of the above conditions is present, and then the web is creped. This is believed to be due to the fact that creping has a substantial bulking effect, especially on webs which have very low interfiber bonding strength. Since bulk and softness are properties which the method of the present invention is utilized to obtain, it is desirable to optimize those properties in the web prior to treatment by the method of the present invention in order to enable them to be even further improved while strength is imparted to the web.

Figure 2:
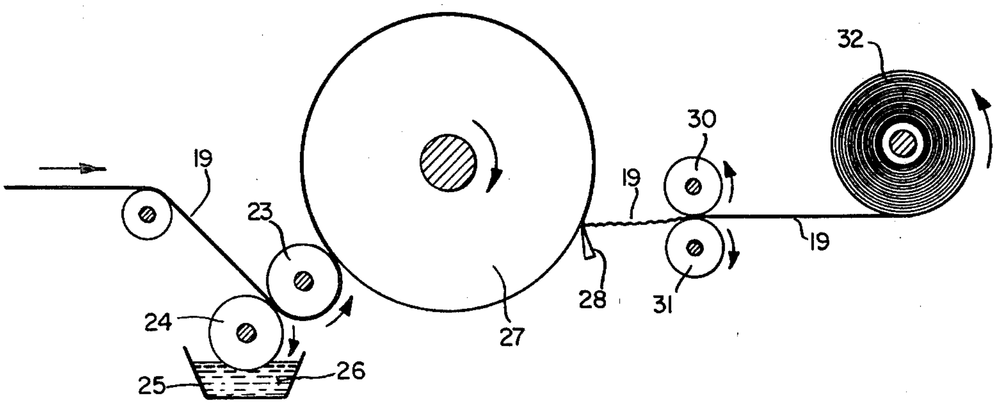
FIG. 2 is a schematic side elevation view of a portion of one form of apparatus for carrying out the method of the present invention.
Figure 3:
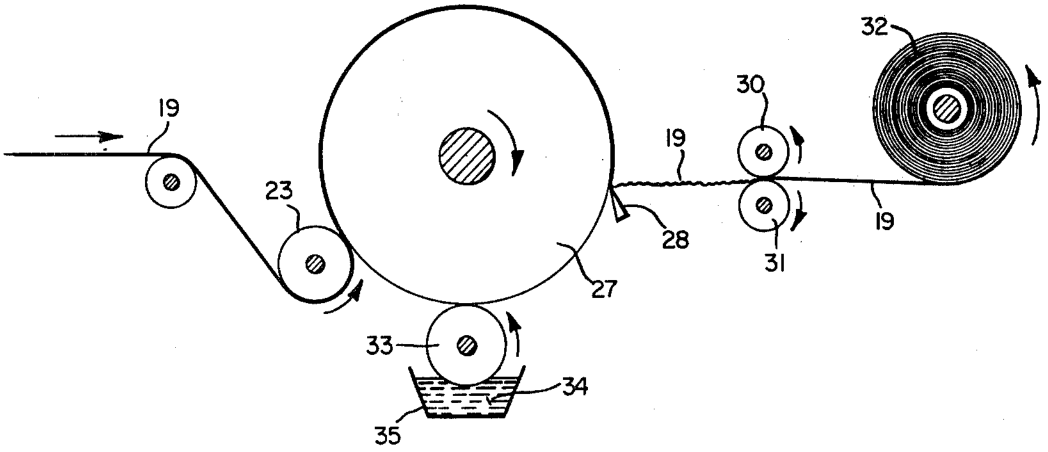
FIG. 3 is a schematic side elevation view of a portion of an alternative form of apparatus for carrying out the method of the present invention.

Regardless of the particular form of the web at this point, it is treated by the method of the present invention to enhance its bulk, softness and strength properties and to impart substantial stretch to it in all directions in its own plane. FIGS. 2 and 3 illustrate two alternative forms of apparatus for carrying out the method of the present invention. Referring to FIG. 2, the web 19 is fed into a nip formed by a smooth rubber press roll 23 and a patterned metal rotogravure roll 24. The lower transverse portion of the rotogravure roll 24 is disposed in a pan 25 containing bonding material 26. In this manner, bonding material is applied to one surface of the web 19 in a fine pattern which will form bonded web portions in which fibers are bonded together at least at certain portions along their length.

The pattern of bonding material applied to the web can be in any form which leaves a substantial portion of the surface of the web free from bonding material. Most preferably the pattern comprises less than about 35% of the total surface area of the web so as to leave about 65% or more of the surface of the web free from bonding material, at least when printed. Thus, any of the patterns taught by U.S. Pat. Nos. 3,047,444; 3,009,822; 3,059,313; and 3,009,823 may be advantageously employed. Some migration of bonding material occurs after printing. Thus, the bonding material penetrates at least partially through the web 19 and in all directions in the plane of the web 19. However, preferably migration in all directions in the plane of the web is minimized so as to leave areas comprising a substantial portion of the web free from any bonding material, for purposes which will become apparent subsequently.

It has been found to be particularly desirable to apply the bonding material in a reticular pattern so that the bonding material forms a net-like web of strength over the web. Thus, it is well-known that papermaking fibers generally have a length less than about ¼ inch and normally have a predominant fiber length less than about 1/16 inch in length. Therefore, when strength is to be primarily imparted to the sheet by a bonding material, as in the present invention, instead of by interfiber bonds of the type conventionally utilized in papermaking, it is important that there be a continuous interconnection of at least some of the fibers by the bonding material throughout the entire web. If the pattern of bonding material is in the form of parallel lines, bars, or other forms of discrete areas, the web will lack substantial strength unless such discrete areas are spaced apart by distances less than average fiber lengths or, typically, less than about 1/16 inch. However, where the pattern of adhesive is reticular or net-like in configuration, the interconnected lines of bonding material application provide a network of strength even where substantial areas, in many cases much larger than 1/16 inch in every direction, are defined between the lines of bonding material application as unbonded web portions.

The web issuing from the nip between rolls 23 and 24 with bonding material on one of its surfaces is then fed around the press roll 23 and brought into engagement with the surface of a rotatable creping drum 27. The creping drum 27 may in some instances comprise a heated pressure vessel such as a Yankee dryer, or in other instances may be a smaller roll and may be unheated. It is characterized by an extremely smooth, polished surface to which the bonding material, applied to the web, adheres. The significance of heating depends upon both the characteristics of the particular bonding material employed and the moisture level in the web. Thus, the bonding material may require drying or curing by heating in which case the creping drum 27 may provide a convenient means to accomplish this. Or, the moisture level of the web being fed to the creping drum 27 may be higher than desired, and the creping drum 27 may be heated to evaporate some of this moisture.

The web is carried on the surface of the creping drum 27 for a distance and then removed therefrom by the action of a creping doctor blade 28. The doctor blade 28 performs a conventional creping operation on the bonded portions of the web 19, that is, it imparts a series of fine fold lines to portions of the web 19 which are adhered to the creping surface 27. However, since the web 19 in this instance is only adhered to the creping surface 27 in a pattern having either a reticular form or comprising a plurality of spaced discrete areas, the creping blade 28 causes the unbonded web portions, which are not attached to the creping drum 27, to puff and arch up to form shaped web portions having excellent softness characteristics.

The web 19 is led from the creping doctor blade 28 through a pair of calender rolls 30 and 31 and wound into a roll 32. Rolls 30 and 31 are utilized to control the maximum thickness or bulk of the resulting sheet product. In view of the manner in which the bulk is created by the arches or puffed areas, this thickness control is important in certain instances.

The bonding material utilized in the process and product of the present invention must be capable of several functions, one being the ability to bond fibers in the web to one another and the other being the ability to adhere the bonded portions of the web to the surface of the creping drum 27. In general, any material having these two capabilities may be utilized as the bonding material, if the material can be dried or cured to set it. Among the bonding materials which are capable of accomplishing both of these functions and which can be successfully used are acrylate latex rubber emulsions, useful on an unheated creping surface; emulsions of resins such as acrylates, vinyl acetates, vinyl chlorides, and methacrylates, all of which are useful on a heated creping surface; and water soluble resins such as carboxy methyl cellulose, polyvinylalcohol, and polyacrylamide. However, in other instances, the bonding material may comprise a mixture of several materials, one having the ability to accomplish interfiber bonding and the other being utilized to create adherence of the web to the creping surface. However, in either instance, the materials are preferably applied as an integral mixture to the same areas of the web. Such materials may comprise any of the materials listed above mixed with a low molecular weight starch, such as dextrin, or a low molecular weight resin such as carboxy methyl cellulose or polyvinylalcohol. Of course, compatible wet strength additives may be used with any of the above materials in order to impart additional wet tensile strength to the resulting sheet material.

In forming the most preferred products of the present invention, elastomeric bonding materials are employed which are basically any materials which are capable of at least 75% elongation without rupture. Such materials generally should have a Young's modulus by stretching which is less than 25,000 psi. Typical materials may be of the butadiene acrylonitrile type, or other natural or synthetic rubber latices or dispersions thereof with elastomeric properties, such as butadiene-styrene, neoprene, polyvinyl chloride, vinyl copolymers, nylon. Elastomeric properties may be improved by the addition of suitable plasticizers with the resin.

Referring to FIG. 3, an alternative arrangement of apparatus is shown for applying bonding material in a fine pattern to one surface of web 19. In this embodiment, a metal rotogravure roll 33 is arranged beneath a creping drum 27. The lower transverse portion of the rotogravure roll 33 runs in contact with bonding material 34 contained in a pan 35. The roll 33 then prints this bonding material on the surface of creping drum 27. The web 19 is fed into engagement with creping drum 19 at a point closely spaced from the point where roll 33 contacts the drum 27. In this manner portions of the web 19 are adhered to the surface of the creping drum 27, and bonding material is simultaneously applied to one surface of web 19 so as to create bonded web portions. In a manner similar to the embodiment described previously, the web is carried for a distance on the surface of the creping drum 27, and is removed therefrom by a creping doctor blade 28 to form the sheet material of the present invention.

It has been found desirable to apply the bonding material 34 to the surface of creping drum 27 just prior to covering that surface with the web 19, especially where the bonding material contains volatile components or components which set or cure quickly, particularly at elevated temperatures in the event the creping drum 27 is heated. This insures that the bonding material will penetrate the web 19 to the thickness desired and that portions of the web will be adhered to the dryer before the bonding material becomes cured and loses its tackiness.

Figure 4:
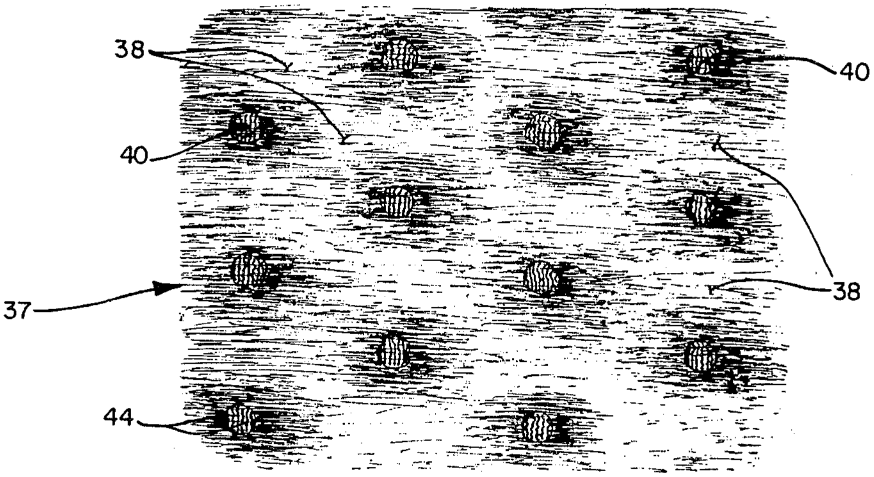
FIG. 4 is a greatly enlarged planar view of a portion of the surface of one form of sheet material of the present invention to which bonding material was applied.

FIG. 4 illustrates one form of sheet material of the present invention in which the bonding pattern comprises a plurality of closely spaced discrete areas. FIG. 4 shows the surface of the sheet to which bonding material was applied. It can be seen that the sheet 37, greatly enlarged in FIG. 4, is characterized by a fine pattern of raised areas 40 and depressions 38 distributed over each of its surfaces. The raised areas 40 and depressions 38 on the one side of the web 37 overlie the respective depressions 38 and raised areas 40 on the opposite side of the web 37 so that essentially it has an undulating cross section of substantially uniform thickness. This can be seen more clearly in FIG. 6. The web 37 contains a bonding material in the raised areas on the side of the web shown in FIG. 4. The bonding material bonds at least some of the fibers together in those raised areas to form bonded web portions which have greater strength than the adjacent unbonded web portions located beneath the raised areas 40 shown in FIG. 4 which do not contain the bonding material. Thus, the unbonded web portions are only held together by the bonds which were formed in the web prior to treatment in accordance with the method of the present invention and, as pointed out above, preferably have very low interfiber bonding strength. It is generally preferred that the bonding material only migrate through a portion of the thickness of the web. However, this situation can be altered substantially by changing the nature of the bonding material so that it migrates to a greater extent. Migration is also influenced substantially by the basis weight of the web itself and by the pressure applied to the web during application of the bonding material thereto, since wicking through the web is enhanced when the fibers are compacted closely together, as by momentary pressure from the patterned rotogravure roll.

The raised surface of each of these bonded web portions contains a plurality of fine crepe marks 41 which also appear as crepe marks 41 on the opposite surface of the sheet; that is, these portions are finely creped from the creping surface 27 since they are the ones adhered to the creping surface 27. Therefore, these areas possess substantial surface softeness even though they contain bonding material which imparts strength to the overall sheet 37. The unbonded areas of the sheet 37 are puffed or arched so that they are raised above the plane of the web 19 on one side of the sheet. This effect is caused by the localized shrinkage of the bonded areas due to the creping action. Thus, the creping of the bonded areas at least shrinks those areas immediately adjacent the creped surface. This causes the unbonded areas between those shrunk areas to be compressed in the plane of the web and in the direction of shrinkage and forced upward out of the plane of the web 19 to allow for their greater dimensions which are not affected by the creping operation at least to the same degree.

When the unbonded web portions are puffed or arched, they account for dimensional changes caused by the creping in a machine direction but also by virtue of their dome-like shape, regardless of the bonding material pattern employed, permit elongation of the web in the cross direction. Therefore, the resulting sheet material 37 possesses substantial stretch not only in the machine direction but also in the cross direction and in all other directions in its own plane. Thus, the stretch is accommodated by the withdrawal of the domes into the plane of the web 19 when the sheet 37 is subjected to tension, regardless of the direction in which that tension is applied. In this manner, the method of the invention provides a simple and convenient process for creating multidirectional stretch in a web without the complexity and difficulty of prior methods such as creping the web in different directions discussed above. Sheet materials of the present invention typically have stretch in the machine direction of from about 14 to about 30%, and stretch in the cross machine direction of from about 5 to about 17%.

Figure 5:
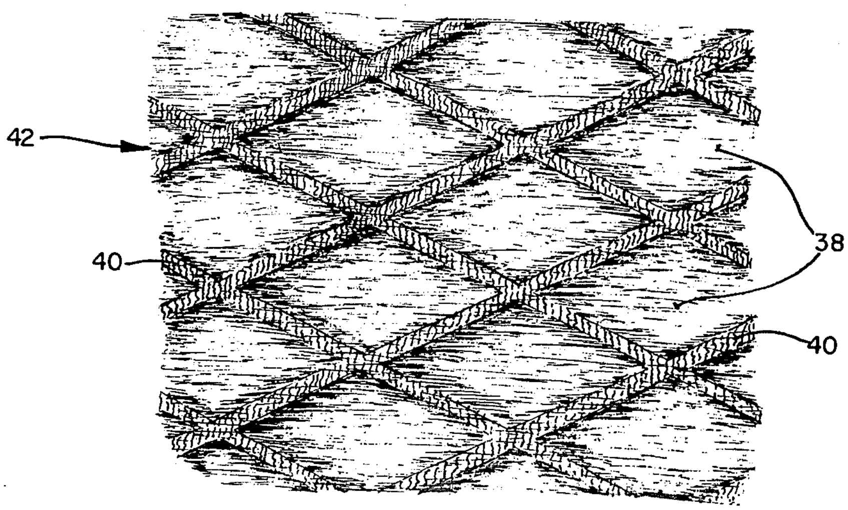
FIG. 5 is a greatly enlarged planar view of a portion of the surface of another form of sheet material of the present invention to which bonding material was applied.

FIG. 5 illustrates the surface of a sheet 42 to which the bonding material is applied in a reticular or net-like pattern. Generally the above description of the structure of FIG. 4 applies also to this embodiment of the sheet material of the present invention. Thus, the sheet has raised portions 40 on one surface in the form of a reticular or interconnected line pattern with depressions 38 between the raised portions 42. The raised portions 40 on one side of the sheet form depressions 38 on the other side of the sheet while the depressions 38 on the one side of the sheet form raised areas 40 on the other side of the sheet. In addition, the raised areas 40 are finely creped on one surface and the creping also shows up as somewhat coarser crepe marks in the depressions 38 on the other side of the sheet.

However, this sheet has an additional feature. Thus, this sheet 42 not only has substantial stretch in all directions in its own plane but also generally has a higher degree of stretch. Since the pattern of creping is net-like rather than in discrete bonded areas, the effect of arching and puffing of the unbonded web portions 38 is even further enhanced, resulting in even greater machine direction and cross direction stretch in the resulting product. In addition, a higher percentage of the web area may remain unbonded relative to a product of the type shown in FIG. 4. Thus, since the bonding pattern in this embodiment is substantially continuous and interconnected, the unbonded web portions 38 between the lines of bonding or bonded web portions 40 can be much larger while providing the strength required. This is due to the continuous lines of adhesively interconnected fibers which are distributed over its surface, providing a net-like web of strength.

Figure 6:
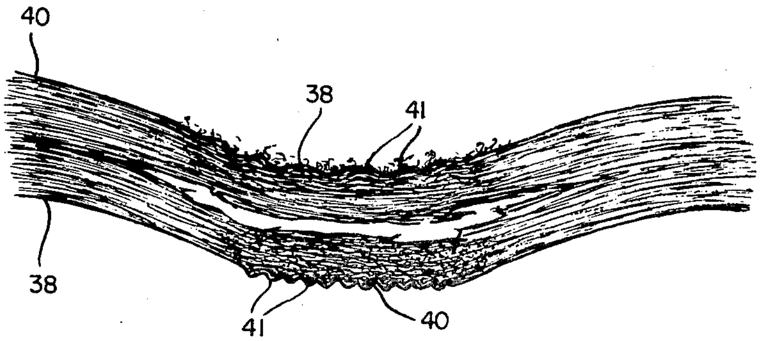
FIG. 6 is a greatly enlarged cross-sectional view of a portion of one form of sheet material of the present invention, illustrating internal splitting of the web in areas adjoining a bonded web portion.

FIG. 6 illustrates a further feature of the invention which can be achieved if desired. FIG. 6 is a greatly enlarged cross-sectional view of a portion of sheet material of the present invention illustrating the manner in which the sheet is split internally and in its own plane in portions adjacent the bonded web portions. Specifically small slits or separations are formed internally of the sheet and in the general plane of the sheet. This effect is achieved most noticeably when the bonding material only penetrates a portion of the thickness of the web. It is believed to be due to the fact that when the bonded web portion is creped, it is locally shrunk, and accordingly, is forced to part or break interfiber bonds with the adjacent and overlying web portions which are not effected to the same extent by the creping.

The following examples are illustrative of the method and the products of the present invention. These examples are intended to describe specific embodiments of the method and of the products of the present invention and are not intended to delineate in any way the limits of the present invention or the scope of the claims.

EXAMPLE I

A web was formed from a fiber furnish consisting of 70% Pictou (a bleached sulphate softwood) and 30% gum (a bleached sulphate hardwood). The web was formed on a conventional papermaking machine generally similar to that shown in FIG. 1, and was creped from a Yankee dryer when it was about 65% dry, that is, when it contained only about 35% moisture by weight. The web was further dried on an afterdryer in the form of heated drums until it was more than about 92% dry. The physical properties of this web were then measured and are set forth in the Table below under the column entitled "Web."

The web was then fed through apparatus similar to that shown in FIG. 2. Thus, it was printed in a nip formed by a patterned gravure roll having a diameter of 14" and an elastomer roll having a diameter of 14" and a ⅜" neoprene cover of a hardness of 78 Shore "A" durometer. The gravure roll surface had a reticular pattern of interconnected hexagons having two of their sides perpendicular to the machine direction and a pattern repeat length of 0.030". The engraved lines of the pattern were 0.007" wide and approximately 30 microns deep. The lines of the pattern comprised approximately 40% of the overall surface area.

The bonding material which was applied to the web by the gravure roll comprised a water solution of 5% tapioca dextrin, 3% carboxy methyl cellulose, 1% propylene glycol, 0.1% formalin, and 0.1% fluorescent dye. This bonding material had a viscosity of 100 centipoise at 25° C., a pH of 7, and a specific gravity of 1.035 at 70° F. The pressure in the printing nip was controlled at 150 psi average and the average basis weight of the sheet was increased, during printing by 17%, of which 1.4% was due to the non-volatile constituents of the bonding material.

The printed web was then applied to the surface of a cast iron creping drum having a Brinell hardness of 277 and a diameter of 5 feet by means of the elastomer roll described above and with an average nip pressure against the creping drum of 137 psi. The creping drum was steam heated to a surface temperature of 220° F., and the drum surface speed was 1500 ft./min. As the web was pressed to the drum, the average dryness was 75%, and before leaving the creping drum, the web had an average dryness of about 95%. The sheet was creped from the surface of the creping drum by a conventional creping doctor blade set at a creping shelf angle of 11° below the radial line at the point of contact. The creped sheet material was wound at a speed of 1350 ft./min., resulting in a foreshortening of the web in the machine direction of 11%, or the formation of 11% crepe in the resulting sheet material. The physical properties of the resulting sheet material were measured and are set forth in the Table below under the column entitled "Sheet." These results clearly indicate a significant increase in the softness, strength, and stretch of the web.

EXAMPLE II

A web formed from a fiber furnish consisting of 70% Pictou (a bleached sulphate softwood) and 30% gum (a bleached sulphate hardwood). The furnish had a freeness of 686 cc. (Canadian Standard Freeness) and contained about 2% by weight of ureaformaldehyde resin to give it wet strength. The web was formed on a conventional papermaking machine generally similar to that shown in FIG. 1, and was creped from a Yankee dryer when it was about 69% dry, that is, when it contained only about 31% moisture by weight. The web was further dried on an afterdryer in the form of heated drums until it was more than about 90% dry. The physical properties of this web were then measured and are set forth in the Table below.

The web was then fed through apparatus similar to that shown in FIG. 2. Thus, it was printed in a nip formed by a patterned gravure roll having a diameter of 14″ and an elastomer roll having a diameter of 14″ and a $\frac{5}{8}$″ neoprene cover of a hardness of 78 Shore "A" durometer. The gravure roll surface had a reticular pattern of interconnected hexagons having two of their sides perpendicular to the machine direction and a pattern repeat length of 0.030″. The engraved lines of pattern were 0.007″ wide and approximately 30 microns deep. The lines of the pattern comprised approximately 40% of the overall surface area.

The bonding material which was applied to the web by the gravure roll comprised a water solution of 7.4% poly-n-methylol acrylamide and 0.5% ammonium chloride based on the weight of poly-n-methylol acrylamide. This bonding material had a viscosity of 158 centipoise at 79° F. and a pH of about 4. The pressure in the printing nip was controlled at 150 psi average and the average basis weight of the sheet was increased during printing by 20% of which 1.5% was due to the non-volatile constituents of the bonding material.

The printed web was then applied to the surface of a cast iron creping drum having a Brinell hardness of 277 and a diameter of 5 feet by means of the elastomer roll described above and with an average nip pressure against the creping drum of 137 psi. The creping drum was steam heated to a surface temperature of 220° F., and the drum surface speed was 1500 ft./min. As the sheet was pressed to the drum, the average dryness was 75% and before leaving the creping drum, the web had an average dryness of about 95%. The sheet was creped from the surface of the creping drum by a conventional creping doctor blade set at a creping shelf angle of 6° below the radial line at the point of contact. The creped sheet was wound at a speed of 1350 ft./min., resulting in a foreshortening of the web in the machine direction of 11%, or the formation of 11% crepe in the sheet. The sheet was then combined with a second sheet of like structure to form a two-ply sheet. The physical properties of the resulting two-ply sheet material were measured and are recorded in the Table below.

These results clearly indicate a significant increase in machine direction and cross direction stretch and in the bulk of the sheets comprising the two-ply sheet material, all of which factors are indicators of its softness, as mentioned previously.

EXAMPLE III

A web formed from a fiber furnish consisting of 70% Soundview (a bleached sulphite softwood) and 30% gum (a bleached sulphate hardwood). The web was formed on a conventional papermaking machine generally similar to that shown in FIG. 1, and was creped from a Yankee dryer when it was about 65% dry, that is, when it contained only about 35% moisture by weight. The web was further dried on an afterdryer in the form of a heated drum until it was more than about 93% dry. The physical properties of this web were then measured and are recorded in the Table below.

The web was then fed through apparatus similar to that shown in FIG. 2. Thus, it was printed in a nip formed by a patterned gravure roll having a diameter of $5\frac{3}{4}$″ and an elastomer roll having a diameter of $5\frac{1}{2}$″ and a $\frac{1}{2}$″ elastomer cover of a hardness of 60 Shore "A" diameter. The gravure roll surface had a reticular pattern of interconnected hexagons having two of their sides perpendicular to the machine direction and a pattern repeat length of 0.1178″ in the cross direction and 0.0678″ wide and approximately 75 microns deep. The lines of the pattern comprised approximately 20% of the overall surface area.

The bonding material which was applied to the web by the gravure roll comprised a water solution of 4% animal glue, 13% urea-formaldehyde resin, and 0.715% polyethylene oxide. This bonding material had a viscosity of about 6200 centipoise at 25° C. and a pH of 4.8. The average basis weight of the sheet was increased during printing by about 13% of which 2.3% was due to the non-volatile constituents of the bonding material.

The printed web was then applied to the surface of a cast iron creping drum having a diameter of 18 inches by means of the elastomer roll described above. The creping drum was heated by hot oil within it to a surface temperature of 180° F., and the drum surface speed was 30 ft./min. The sheet was creped from the surface of the creping drum by a conventional creping doctor blade set at a creping shelf angle of 10° below the radial line at the point of contact. The creped sheet was wound at a speed of 25.5 ft./min., resulting in a foreshortening of the web in the machine direction of 18%, or the formation of 18% crepe in the sheet. The physical properties of the resulting sheet material were measured and are set forth in the Table below.

These results clearly indicate a significant increase in the cross direction and machine direction stretch and in the bulk of the sheet.

TABLE

| | EXAMPLE I | | EXAMPLE II | | EXAMPLE III | |
|---|---|---|---|---|---|---|
| | | | One Ply | Two Ply | | |
| Properties | Web | Sheet | Web | Sheet | Web | Sheet |
| Machine Direction Tensile Strength (oz./in.) | 7.2 | 10.2 | 9.4 | 15.1 | 41.0 | 19.4 |
| Cross Direction Tensile Strength (oz./in.) | 3.8 | 5.3 | 6.0 | 8.2 | 21.6 | 14.7 |
| Machine Direction Stretch (%) | 6.2 | 18.2 | 6.5 | 17.6 | 11.2 | 28.0 |
| Cross-Machine Direction Stretch (%) | 3.2 | 9.1 | 3.0 | 12.2 | 3.9 | 5.3 |
| Basis Weight (lbs./2880 sq. ft.) | 9.7 | 11.1 | 8.6 | 19.3 | 26.1 | 30.5 |
| Bulk Under Loading of 235 grams/sq. in. (mils/24 sheets) | 103 | 155 | 94.0 | 240.0 | 162 | 322 |
| Machine Direction Wet Tensile Strength | | | | | | |

TABLE-continued

| Properties | EXAMPLE I Web | EXAMPLE I Sheet | EXAMPLE II One Ply Web | EXAMPLE II Two Ply Sheet | EXAMPLE III Web | EXAMPLE III Sheet |
|---|---|---|---|---|---|---|
| (oz./in.) | | | 3.9 | 8.1 | 15.6 | 8.4 |

The sheet materials of the present invention, resulting from treatment with an elastomeric bonding material of webs which are formed by deposition from an aqueous slurry of fibers, water, and preferably, a debonding agent, have been found to be superior, in terms of such properties as softness and wiping ability, to any other prior art sheet material so formed but not subjected to such treatment. These properties may be characterized in many different ways when applied to sheet material used in sanitary paper products such as tissues, towels and the like. This is due to the fact that softness and wiping ability in large measure are subjective impressions one gets from handling the sheet material, and involve an assessment of the combination of thickness or bulk, density, resistance to bending and compression, and other physical properties susceptible to tactile observation.

However, for purposes of measuring the acceptability of these sheet materials of the present invention for use in the above-mentioned sanitary paper products from the general standpoint of softness, two different properties have been found which, in combination, provide a basis for accurately distinguishing such materials from those of the prior art. These properties are (1) the TEA-to-stiffness ratio of the sheet material and (2) the average calculated density throughout the thickness of the sheet material under no load. These properties, the desired ranges therefor, and the procedures and techniques for determining them are described in detail herein so as to explain the invention and to permit others to clearly ascertain its scope with regard to such sheet materials.

The TEA-to-stiffness ratio is obtained by first measuring the TEA (tensile energy absorption) of a given specimen of sheet material in accordance with TAPPI Test, T494 su-64, in both the machine direction (M.D.) and the cross-machine direction (C.D.) in kilogram meters per square meter, with the exception that a jaw spacing of 2 inches rather than the 8 inches recommended by TAPPI is used because of the particular nature of the products, some of which have lines of perforations which must be avoided. This test method is not a TAPPI standard but is suggested by TAPPI as the most suitable method to date. The stiffness of the product is then measured by subjecting the specimen to the test set forth in TAPPI Standard Test, T451 m-60, in both the machine direction and the cross-machine direction, to determine its effective overhanging length (critical length) denoted as "L" in centimeters. The stiffness of the product is proportional to the cube of the effective overhanging length and is therefore expressed herein as $L^3$.

Briefly described, the TEA of a product is obtained by clamping a 1.000±0.005 in. (2.54±0.01 cm) wide specimen in two spaced sets of jaws when they are 2 in. (5.08 cm) apart, with any noticeable slack being pulled out of the strip before clamping. Strain is applied to the specimen by moving the jaws further apart at a constant rate of 1.00±0.01 in./min. (2.54±0.02 cm/min) while recording the elongation with an accuracy of ±2% of the actual value and the load in either pounds or kilograms with an accuracy of ±0.5% until breakage of the specimen. The area under the load-elongation curve is then measured by a planimeter or integrator with an accuracy of ±2%. The TEA is then calculated using the equation:

TEA=(100A/LW) with units of kilogram-meters per square meter where:

A=area under load-elongation curve in kilogram-centimeters

L=initial span between clamp lines in centimeters

W=initial width of specimen in centimeters.

The stiffness of a product is obtained with a Clark softness Tester by placing the end of a 15 to 50 mm. (⅝ to 2 inches) wide specimen with parallel edges and of convenient length between the jaws or rollers comprising a clamp mounted on a rotatable spindle. The spindle can be rotated about a horizontal axis parallel to the long axis of the jaws or rollers and perpendicular to the long axis of the paper strip. The overhanging length of the specimen is adjusted by resetting the jaws or turning the rollers until, when the spindle is slowly rotated back and forth through 90°, the specimen just falls over at each of the end points of rotation. The overhanging or critical length L is then measured from the line where the edges of the jaws or the rollers grip the specimen to the end of the strip. For purposes of defining the products of the present invention, the stiffness is indicated by the cube of L.

In using the above tests for TEA and stiffness to form a ratio of which defines a desired property of a fibrous product of the invention, specimens for each test are taken in both the machine direction (M.D.) and the cross-machine direction (C.D.). Preferably several tests are made with each and the results averaged in order to eliminate errors due to measurement or to formation. The resulting values are then combined in ratio form as follows:

$$\text{The } TEA\text{-to-stiffness ratio} = \frac{TEA_{(M.D.)} \times TEA_{(C.D.)}}{L^3_{(M.D.)} \times L^3_{(C.D.)}}$$

The average calculated density throughout the thickness of the sheet material under no load is determined by the following procedure. An approximately one inch long specimen of the product is oven dried to eliminate moisture therein. The dried specimen is inserted in a small container and is slowly immersed at atmospheric pressure in a solution of butyl methacrylate monomer therein containing a small amount of benzoyl peroxide as a catalyst. The container and the immersed specimen are placed in an oven having an interior temperature of 55° C. for a period of about 16 hours to cause polymerization of the monomer. A small amount of volumetric shrinkage occurs which is insignificant because it is constant for each sample. Cross-sections are cut from the resulting embedded sample using a microtome, the sections having a thickness of 10–12 microns.

Each section is placed on a glass slide, and covered with mineral oil and a glass cover slip. The section of the specimen is now photographed by transmitted light through a microscope having a 24 mm of objective lens and an eye piece of 12.5X. The bellows extension is 50 cm. The resulting linear magnification is 75 and the magnified picture is printed in a 5"×7" format.

The resulting photomicrograph is mounted on a board, and a transparent paper is placed over the photomicrograph. The outline of the resulting cross-section shown in the photomicrograph is now traced onto the transparent paper, care being taken to follow the basic curves and undulations of the cross-sectional outline to an extent sufficient to get inside the outline at least 95% or more of the cross-sectional area including any stray fibers. Certain stray fibers deviating from the outline of the cross-section should be left outside the area in order to obtain truer density values. A planimeter is then used to measure the area within the inside edge of the line defining the cross-sectional outline in square inches. Several photographs of each specimen are preferably used and several cross-sectional area measurements are taken, the results being average to obtain a reliable cross-sectional area.

The actual thickness of the sample was obtained by dividing the area by the length of the cross-section outlined and by the linear magnification of 75. The calculated density under no load is grams per cubic centimeter was obtained by the equation:

$$\text{calculated density g/cc} = \frac{\text{basis weight g/m}^2}{\text{actual thickness (in)} \times 2.54 \text{ cm} \times 10{,}000 \text{ cm}^2}$$

where the basis weight is that of the orginial sheet material from which the specimen was taken.

All of the sheet materials of this improved form of the invention comprise a web of randomly arranged lignocellulosic fibers, and an elastomeric bonding material, such as that mentioned previously, at some of the contact points between said fibers to impart structural integrity to the sheet material or web. The lignocellulosic fibers may be any of the wood pulp fibers normally used in papermaking. Depending upon the particular fine pattern in which the bonding material is applied to the web, and the amount of migration of such material through the web, the elastomeric bonding material may form bonded web segments spaced apart by unbonded web segments. In a particular embodiment, the bonding material is present in the web in a continuous, predetermined reticular pattern which defines a discontinuous predetermined intermittent pattern of discrete unbonded web segments.

Advantageously, the fibers are treated with a debonding agent in an amount sufficient to reduce their interfiber bonding capacity so that a flat sheet consisting essentially of such fibers has a breaking length of less than 800 meters and preferably, less than 700 meters, as determined by the procedure set forth in TAPPI Revised Tentative Standard T 220 m-60. In this procedure, a pulp sheet having a basis weight (r) in 0 grams per square meter (on a moisture-free basis) is measured to determine its tensile break load (p) in kilograms on a 15-mm. strip. The breaking length in meters is calculated from the equation:

$$\text{breaking length} = \frac{200{,}000p}{3r}$$

and is equivalent to the length in meters of a uniformly wide strip of paper which, if held at one end (e.g., freely suspending a coil of that paper by its tab end), would just cause the strip to break under its own weight.

The following examples comparatively illustrate the difference between the sheet materials of the present invention and conventional sheet materials used in the past. This difference is clearly apparent on the basis of the properties measured in accordance with the above procedures and in large measure stems from the use of elastomeric bonding materials therein along with a reduced amount of interfiber bonding due to natural bonds prior to drying of the web. However, any specific enumeration of detail contained therein should not be interpreted as a limitation in the concept or scope of the invention.

EXAMPLE IV

As an illustration of the prior art, a first web was formed from a fiber furnish consisting of water and the following conventional papermaking pulps:

20% Softwood Bleached Kraft
20% Softwood Bleached Sulfite
40% Hardwood Bleached Kraft
20% Mechanical Fiber The web was formed on a conventional Fourdrinier-type papermaking machine and was transferred by a felt run to the surface of a Yankee Dryer. The web was creped from the Yankee Dryer when it was about 65% dry, that is, when it contained only about 35% moisture by weight. The web was further dried in an after-dryer section in the form of heated drums until it was more than about 92% dry. The resultant sheet material was one which is typically used in sanitary paper products, such as wet creped bathroom tissue, and possessed the following general properties:

Basis Weight 20.8 gms/M$^2$—12.3 lb/2880 ft$^2$
Bulk 0.081 in/24 sheets (Federal Bulker)
Tensile (MD) 12.8 oz/in (TAPPI STANDARD, T220 m-60)
Stretch (MD) 7.9% (TAPPI STANDARD, T220 m-60)
TEA (MD) 0.993 Kg—M/M$^2$ (TAPPI TEST, T494 su-64)
Tensile (CD) 5.3 oz/in (TAPPI STANDARD, T220 m-60)
Stretch (CD) 3.3% (TAPPI STANDARD, T220 m-60)
TEA (CD) 0.189 Kg—M/M$^2$ (TAPPI TEST, T494 su-64)
Lo (MD) 5.5 cm (Critical length—TAPPI STANDARD, T-451 m-60)
Lo (CD) 4.5 cm (Critical length—TAPPI STANDARD, T-451 m-60)

Figure 7:
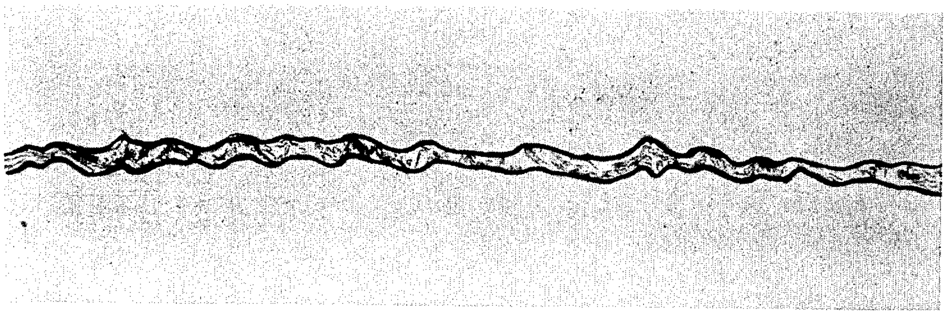
PRIOR ART FIG. 7
FIG. 7 is a photomicrograph, having a linear magnification of 75, of a cross-section of one type of prior art web, formed as described in Example IV, and having an outline drawn thereover according to the procedure described for determining its calculated density.

This first web was subjected to the tests described above and was found to have a TEA-to-stiffness ratio of $0.12 \times 10^{-4}$ and an average calculated density throughout the thickness of the web under no load of 0.441 grams per cubic centimeter. A typical cross-section of this first web photographed with a linear magnification of 75 as described above for determining the average calculated density is shown in FIG. 7. The very appearance of the sheet indicates the closely-packed disposition of the fibers and the relative harshness of the sheet even after creping has occurred. An outline of the cross-section has also been drawn on the photograph to illustrate the manner in which this is done for purposes of determining the area and the average thickness of the cross-section.

As another illustration of the prior art, a second web was formed from a fiber furnish consisting of water and the following papermaking pulps:

30% Softwood Bleached Kraft
25% Softwood Bleached Sulfite

35% Hardwood Bleached Kraft
10% Mechanical Fiber

The web was formed on a conventional Fourdrinier-type papermaking machine and was transferred by a felt run to the surface of a Yankee Dryer. The web was creped from the Yankee Dryer when it was about 94% dry, that is, when it contained only about 6% moisture by weight. The resultant sheet material was one which is typically used in sanitary paper products, such as dry creped bathroom tissue, and possessed the following general properties:

Basis Weight 9.6 lbs/2880 $ft^2$
Bulk 0.086 in/24 sheets (Federal Bulker)
Tensile (MD) 12.6 oz/in (TAPPI STANDARD, T220 m-60)
Stretch (MD) 17.5% (TAPPI STANDARD, T220 m-60)
TEA (MD) 1.29 Kg—M/$M^2$ (TAPPI TEST, T494 su-64)
Tensile (CD) 2.4 oz/in (TAPPI STANDARD, T220 m-60)
Stretch (CD) 5.6% (TAPPI STANDARD, T220 m-60)
TEA (CD) 0.20 Kg—M/$M^2$ (TAPPI TEST, T494 su-64)
Lo (MD) 3.8 cm (Critical length—TAPPI STANDARD, T-451 m-60)
Lo (CD) 4.5 cm (Critical length—TAPPI STANDARD, T-451 m-60)

Figure 8:
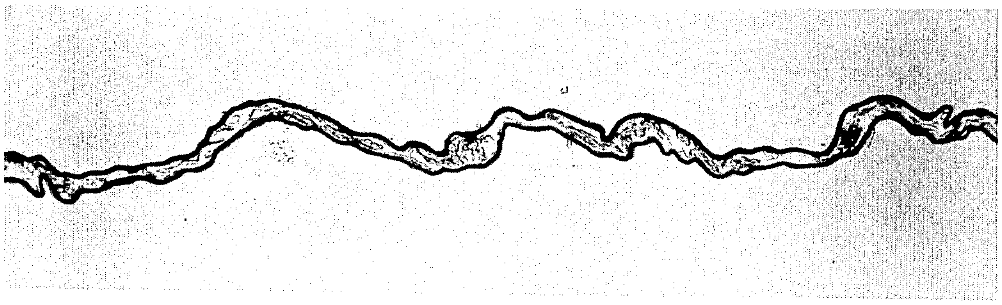
PRIOR ART FIG. 8
FIG. 8 is a photomicrograph, having a linear magnification of 75, of a cross-section of another type of prior art web, formed as described in Example IV, and having an outline drawn thereover according to the procedure described for determining its calculated density.

This second web was subjected to the tests described above and was found to have a TEA-to-stiffness ratio of $0.527\times10^{-4}$ and an average calculated density throughout the thickness of the web under no load of 0.466 grams per cubic centimeter. A typical cross-section of this second web photographed with a linear magnification of 75 as described above for determining the average calculated density is shown in FIG. 8. The very appearance of the sheet indicates the closely-packed disposition of the fibers and the relative harshness of the sheet even after creping has occurred. An outline of the cross-section has also been drawn on the photograph to illustrate the manner in which this is done for purposes of determining the area and the average thickness of the cross-section.

By comparison, as an illustration of the present invention, a third web was formed from an unrefined fiber furnish consisting of water and the following papermaking pulps:

80% Softwood Bleached Kraft
20% Hardwood Bleached Kraft

In addition, Quaker 2000, a debonding agent manufactured by Quaker Chemical Company, Conshohocken, Pennsylvania, used to reduce interfiber bonding capacity, was added at an amount of 0.25% by weight of the wood pulp.

The web was formed on a conventional Fourdrinier-type papermaking machine and transferred to a synthetic twill fabric of 72×60 mesh by means of a suction pickup shoe at a point where the web is carried on a stretch of the Fourdrinier wire running between two support rolls. While being conveyed on the fabric, the web was subjected to a vacuum applied to the underside of the fabric of 10–11 inches mercury for a duration of 15 milliseconds. This reduced the moisture content of the web to approximately 70% by weight of the wet web. The web was further dried on the fabric by passing heated air at 260° F. through it while moving the fabric through a tunnel dryer. The tunnel dryer had sufficient thermal capacity to reduce the moisture content of the web to less than 10 percent by weight of the wet web, so that the web was now more than 90% dry. The web was then fed through apparatus similar to that shown in FIG. 2. Thus, it was printed in a nip formed by a patterned gravure roll having a diameter of 5" and an elastomeric roll having a diameter of 5" and a neoprene cover ½" thick and having a hardness of 65 Shore A durometer. The gravure roll had a reticular pattern of interconnected distorted hexagons having two sides perpendicular to the machine direction and a pattern repeat length of 0.040". The distance from apex to apex in the cross direction was 0.080". The engraved lines of the pattern were 180–190 microns wide and approximately 46 microns deep. The engraved lines of the pattern comprised approximately 27% of the overall surface area.

The bonding material which was applied to the web by the gravure roll comprised an elastomeric bonding material consisting of a mixture of 70% Celanese 6308 and 30% Celanese 5269 by weight. This bonding material is an aqueous emulsion with a solids content of 45% and a viscosity of 250 centipoise at 25° C. as measured on a Brookfield RFV viscometer spindle #3 at 20 RPM. The pressure in the printing nip was controlled at 100 psi average and the average basis weight of the sheet was increased during printing by 12.3%.

The printed web was then applied to the surface of a cast iron creping drum having a diameter of 15 inches by means of the elastomeric roll described above and with an average nip pressure of 125 psi. The creping drum was oil heated to a surface temperature of 212° F. and the drum surface speed was 60 ft./min. As the web was pressed to the drum, the average dryness was 84%, and upon leaving the drum, the web had an average dryness of about 94%. The web was creped from the surface of the drying drum by a conventional creping doctor blade set at a creping angle of 6° below the radial line at the point of contact. The creped web or sheet material was wound at a speed of 50.4 ft./min. resulting in a foreshortening in the machine direction of 19%, or the formation of 19% crepe in the resultant sheet material. The web possessed the following general properties:

Basis Weight 22.2 lbs/2880 $ft^2$
Bulk 0.300"/24 sheets (Federal Bulker)
Tensile (MD) 15.6 oz/in (TAPPI STANDARD, T220 m-60)
Stretch (MD) 26.5% (TAPPI STANDARD, T220 m-60)
TEA (MD) 2.10 Kg—M/$M^2$ (TAPPI TEST, T494 su-64)
Tensile (CD) 7.3 oz/in (TAPPI STANDARD, T220 m-60)
Stretch (CD) 16.8% (TAPPI STANDARD, T220 m-60)
TEA (CD) 1.09 Kg—M/$M^2$ (TAPPI TEST, T494 su-64)
Lo (MD) 3.4 cm (Critical length—TAPPI STANDARD, T-451 m-60)
Lo (CD) 4.0 cm (Critical length—TAPPI STANDARD, T-451 m-60)
Elastomeric bonder content by analysis 5.5%

Figure 9:
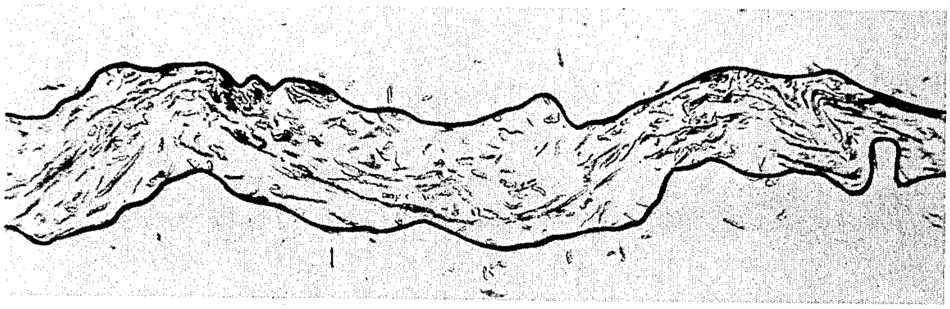
FIG. 9 is a photomicrograph, having a linear magnification of 75, of a cross-section of a web of the present invention, formed as described in Example IV, and having an outline drawn thereover according to the procedure described for determining its calculated density.

This third web was subjected to the tests described above and was found to have a TEA-to-stiffness ratio of $9.1\times10^{-4}$ and an average calculated density throughout the thickness of the web under no load of 0.136 grams per cubic centimeter. A typical cross-section of this third web photographed with a linear magnification of 75 as described above for determining the average calculated density is shown in FIG. 9. It is readily apparent from the appearance of this sheet that the fibers are loosely arranged so as to provide low density and high bulk, both of which are key factors in the softness of a web. An outline of the cross-section has also been drawn on the photograph to indicate the manner in which this is done for purposes of determining the area and the average thickness of the cross-section.

The results for the three webs in Example IV are set forth in Table I for comparative purposes.

TABLE I

| Web | TEA-to-Stiffness Ratio | Calculated Density |
|---|---|---|
| First Web | $0.12 \times 10^{-4}$ | 0.441 gms/cc |
| Second Web | $0.527 \times 10^{-4}$ | 0.466 gms/cc |
| Third Web | $9.1 \times 10^{-4}$ | 0.136 gms/cc |

From the above data, it can be seen that a marked product improvement has resulted in the third web, which constitutes a preferred embodiment of the present invention, with respect to properties as described which are believed to be most indicative of the softness and wiping ability of the sheet material of the present invention.

In view of the above description of specific embodiments of the method and products of the present invention, it can be seen that the present invention provides a new and improved form of sheet material which has a combination of properties heretofore not easily obtainable in paper webs. Thus, the sheet materials of the present invention are quite strong but also are extremely soft and bulky. In addition, the sheet material of the present invention has substantial stretch in all directions in its own plane. One of the surprising features of the products of the present invention is the simplicity of the method and apparatus by which they are formed, especially in view of some of the alternative methods utilized in the past to achieve some of these features individually.

From the above, it will be apparent that various modifications in the method and the products described in detail herein may be made within the scope of the invention. For example, the composition of the bonding material may vary quite widely as may also the pattern in which the bonding material is applied to the web. Moreover, the particular apparatus utilized to accomplish the method of the invention is not significant. For example, a wide variety of different means can be used for drying the web, creping the web, and applying bonding material to the web. Therefore, the invention is not to be limited to the specific details of the method and products described herein except as may be required by the following claims.

What is claimed is:

1. A strong, soft, fibrous sheet material having substantial stretch in all directions in its own plane, said sheet material comprising a web of predominantly cellulosic fibers having a length of less than about ¼ inch and having bonding material disposed in a fine pattern in said sheet material for producing a pattern of bonded portions and portions unbonded by said bonding material in said sheet material, said sheet material having a basis weight of from about 6 to about 60 lbs. per ream of 2880 square feet, said bonded web portions being finely creped to impart softness and stretch thereto, said bonding material having been applied in such amount as to result in a sheet having at least about 1.4% non-volatile constituents of bonding material based on the weight of the dry web.

2. The sheet material according to claim 1, wherein said bonded web portions are arranged in a discontinuous predetermined intermittent pattern of discrete solid areas.

3. The sheet material according to claim 1, wherein said bonded web portions are arranged in a continuous predetermined reticular pattern so as to define a discontinuous predetermined intermittent pattern of discrete unbonded web portions.

4. The sheet material according to claim 1, wherein said bonding material penetrates only a portion of the thickness of said web in said bonded web portions.

5. The sheet material according to claim 1, wherein said bonding material is provided by an elastomeric material.

6. The sheet material according to claim 1, wherein said web is formed by deposition of fibers from a gaseous suspension.

7. The sheet material according to claim 1, wherein said web is formed from an aqueous slurry of papermaking fibers.

8. A bathroom tissue which essentially consists of one ply of the sheet material as defined by claim 7.

9. A bathroom tissue which essentially consists of two plies of the sheet material as defined by claim 7.

10. A paper towel which essentially consists of one ply of the sheet material as defined by claim 7.

11. A paper towel which essentially consists of two plies of the sheet material as defined by claim 7.

12. The sheet material according to claim 7, wherein said web has an average calculated density throughout its thickness under no load of less than 0.200 grams per cubic centimeter.

13. The sheet material according to claim 7, wherein said web has an average calculated density throughout its thickness under no load of less than 0.150 grams per cubic centimeter.

14. The sheet material according to claim 7, wherein said bonding material has been cured.

15. The sheet material according to claim 7, wherein said web has been formed under conditions of reduced pressing until substantially dried so as to reduce the amount of interfiber contact and, accordingly, its interfiber bonding strength.

16. The sheet material according to claim 7, wherein said web has been creped over its entire surface prior to application of said bonding material, whereby interfiber bonds are disrupted and broken by creping action.

17. The sheet material according to claim 7, wherein said papermaking fibers have been treated with a chemical debonding agent to reduce their interfiber bonding capacity.

18. The sheet material according to claim 17, wherein said fibers have a natural interfiber bonding capacity, resulting from treatment with the debonding agent, such that a flat sheet consisting essentially of such fibers has a breaking length of less than 800 meters.

19. A strong, soft, fibrous sheet material having substantial stretch in all directions in its own plane, said sheet material comprising a web of predominantly papermaking fibers and having bonding material disposed in a fine pattern in said sheet material for producing a pattern of bonded portions and portions unbonded by said bonding material in said sheet material, said sheet material having a basis weight of from about 6 to about 60 lbs. per ream of 2880 square feet, the amount of bonding material disposed in said sheet material being at least about 1.4% non-volatile constituents based on the weight of the dry web, said bonded web portions being finely creped to impart softness and stretch thereto, and wherein portions of said web adjoining said bonded web portions are split internally in the general plane of said web, whereby said web has increased bulk, softness and flexibility.

20. A strong, soft fibrous sheet material having substantial stretch in all directions in its own plane, said sheet material comprising:

- a web of predominantly cellulosic fibers having a length of less than about ¼ inch, said sheet material having a basis weight of from about 6 to about 60 pounds per ream of 2880 square feet,
- said web being characterized by a fine pattern of raised areas and depressions distributed over each of its surfaces, the raised areas on one side of said web forming the depressions on the other side of said web and the depressions on one side of said web forming the raised areas on the other side of said web, and
- a bonding material disposed in the raised areas on one side of said web so as to bond at least some of the fibers together therein to form bonded web portions of greater strength than adjacent unbonded web portions which do not contain said bonding material, said bonding material being in an amount of at least about 1.4% non-volatile constituents of bonding material based upon the weight of the dry web,
- the raised surface of each of said bonded web portions being finely creped to impart softness thereto.

21. A strong, soft, fibrous sheet material having substantial stretch in all directions in its own plane and being suitable for sanitary wiping purposes, such sheet material comprising a web defined by a matrix of cellulosic fibers, said web being itself characterized by such reduced interfiber bonding strength as to have inadequate structural integrity for sanitary wiping purposes, said web being primarily cellulosic fibers having a length of less than about ¼ inch, said sheet material having a basis weight of from about 6 to about 60 lbs. per ream of 2880 square feet, and said sheet material further comprising a fine patterned applique of bonding material on one surface thereof, in interfiber bonding amount comprising at least about 1.4% non-volatile constituents based on the weight of the dry web, such that a substantial portion of said surface of said web is free from said bonding material, said applique penetrating said web at least part way through the thickness thereof, said applique defining bonded regions in the sheet material whereat the fibers are bonded together by said bonding material to contribute to the strength of said sheet material and impart structural integrity thereto, whereas in the unbonded regions of the sheet material very little interfiber bonding strength exists, said sheet material being further characterized in that said bonded regions are differentially creped to impart softness and stretch to the sheet material, and by a fine pattern of raised areas and depressions distributed over at least one of the face surfaces thereof.

22. The sheet material according to claim 21, said cellulosic fibers being lignocellulosic fibers, said bonding material being elastomeric, and said web having a basis weight of from about 10 to about 30 lbs. per ream of 2880 square feet, a TEA-to-stiffness ratio greater than $1.50\times10^{-4}$, and an average calculated density throughout its thickness under no load of less than 0.300 grams per cubic centimeter.

23. The sheet material according to claim 21, wherein said bonding material is selected from the group consisting of acrylic latex rubber emulsion, acrylate emulsion, vinyl acetate emulsion, vinyl chloride emulsion, methacrylate emulsion, carboxymethylcellulose, polyvinylalcohol and polyacrylamide.

24. The sheet material according to claim 21, wherein said bonding material is an elastomeric bonding material capable of at least 75% elongation without rupture and having a Young's modulus by stretching which is less than 25,000 p.s.i.

25. The sheet material according to claim 24, wherein said elastomeric bonding material is selected from the group consisting of butadiene/acrylonitrile, natural or synthetic rubber latices or dispersions thereof, butadiene-styrene, neoprene, polyvinyl chloride, vinyl copolymers and nylon.

26. A strong, soft, fibrous sheet material having substantial stretch in all directions in its own plane and being suitable for sanitary wiping purposes, said sheet material comprising a web defined by a matrix of cellulosic fibers, said web being itself characterized by such reduced interfiber bonding strength as to have inadequate structural integrity for sanitary wiping purposes, said web comprising cellulosic fibers having a length of less than about ¼ inch and having a basis weight of from about 6 to about 60 lbs. per ream of 2880 square feet, and said sheet material further comprising a fine patterned applique of bonding material on one surface thereof, in interfiber bonding amount comprising at least about 1.4% non-volatile constituents based on the weight of the dry web, such that a substantial portion of said surface of said web is free from said bonding material, said applique penetrating said web at least part way through the thickness thereof, said applique defining bonded regions in said sheet material whereat the fibers are bonded together by said bonding material to contribute to the strength of said sheet material and impart structural integrity thereto, whereas in the unbonded regions of said sheet material very little interfiber bonding strength exists, said sheet material being further characterized by a fine pattern of raised areas and depressions distributed over at least one of the face surfaces thereof with said bonding material being disposed in the raised areas on at least one face surface and the raised areas being finely creped.

27. A soft, absorbent, creped fibrous web formed by deposition from an aqueous slurry, said web comprising

- randomly arranged, contacting papermaking fibers, and
- an elastomeric bonding material at some of the contact points between said fibers to impart structural integrity to said web, said bonding material comprising at least about 1.4% non-volatile constituents based on the weight of the dry web, and
- wherein said web has a basis weight of from about 10 to about 30 lbs. per ream of 2880 square feet, a TEA-to-stiffness ratio greater than $1.5\times10^{-4}$, an average calculated density throughout its thickness under no load of less than 0.300 grams per cubic centimeter, and said web being finely creped at the portions having bonding material.

28. The fibrous web according to claim 27, wherein portions of said web adjoining said bonded web portions are split internally in the general plane of the web, whereby said web has increased bulk, softness and absorbency.

29. The fibrous web according to claim 27, wherein said elastomeric bonding material is present in said web in a continuous predetermined reticular pattern so as to define a discontinuous predetermined intermittent pattern of discrete unbonded web segments.

30. The fibrous web according to claim 27, wherein said elastomeric bonding material is present in said web in a predetermined pattern of bonded web segments spaced apart by unbonded web segments.

31. The fibrous web according to claim 27, wherein said web has a TEA-to-stiffness ratio greater than $2.0\times10^{-4}$.

32. The fibrous web according to claim 31, wherein said elastomeric bonding material is present in said web in a predetermined pattern of bonded web segments spaced apart by unbonded web segments.

33. The fibrous web according to claim 31, wherein said elastomeric bonding material is present in said web in a continuous predetermined reticular pattern so as to define a discontinuous predetermined intermittent pattern of discrete unbonded web segments.

34. The fibrous web according to claim 27, wherein said web has a TEA-to-stiffness ratio greater than $7.0\times10^{-4}$.

35. The fibrous web according to claim 34, wherein said elastomeric bonding material is present in said web in a predetermined pattern of bonded web segments spaced apart by unbonded web segments.

36. The fibrous web according to claim 34, wherein said elastomeric bonding material is present in said web in a continuous predetermined reticular pattern so as to define a discontinuous predetermined intermittent pattern of discrete unbonded web segments.

37. The fibrous web according to claim 27, wherein said web has an average calculated density throughout its thickness under no load of less than 0.200 grams per cubic centimeter.

38. The fibrous web according to claim 37, wherein said elastomeric bonding material is present in said web in a continuous predetermined reticular pattern so as to define a discontinuous predetermined intermittent pattern of discrete unbonded web segments.

39. The fibrous web according to claim 27, wherein said web has an average calculated density throughout its thickness under no load of less than 0.150 grams per cubic centimeter.

40. The fibrous web according to claim 39, wherein said elastomeric bonding material is present in said web in a predetermined pattern of bonded web segments spaced apart by unbonded web segments.

41. The fibrous web according to claim 39, wherein said elastomeric bonding material is present in said web in a continuous predetermined reticular pattern so as to define a discontinuous predetermined intermittent pattern of discrete unbonded web segments.

* * * * *